Oct. 24, 1961     E. C. CARLSON     3,005,360

REVERSING MECHANISM

Filed Oct. 10, 1960

Inventor:
Ernest C. Carlson
Paul O. Pippel
Atty.

:::
United States Patent Office 3,005,360
Patented Oct. 24, 1961

3,005,360
REVERSING MECHANISM
Ernest C. Carlson, Wheaton, Ill., assignor to International Harvester Company, Chicago, Ill., a corporation of New Jersey
Filed Oct. 10, 1960, Ser. No. 61,419
12 Claims. (Cl. 74—792)

This invention pertains to a mechanism for transmitting rotational movement in one direction of rotation and alternately in the opposite direction of rotation, that is to say, a reversing mechanism.

It is a primary object of the invention to provide a simple, relatively low cost yet effective reversing mechanism of the type mentioned such as can be advantageously used in the feed drive of certain agricultural implements such as field harvesters where the need of reversing the drive is relatively infrequent and the reversal is for short periods of time for the purpose of running the feed mechanism backwards to unplug or open up the feed throat of the implement, after which the feed mechanism is allowed to operate in the normal direction until such time as plugging of the throat may again occur.

Other objects and various features of the invention will appear from the following detailed description, read with the accompanying drawing, in which FIGURE 1 is a longitudinal sectional view of a preferred form of the reversing mechanism of the present invention with the parts shown in position for normal rotation of the output shaft;

Figure 4:
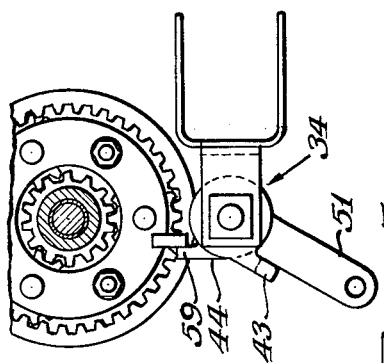
FIGURE 4 is an end view of the FIG. 3 showing as seen from the right.

Referring to the drawing figures in detail, the reference numeral 1 designates a shaft from which power is received from any suitable source as an internal combustion engine for the operation of the feed mechanism of a field harvester, for instance. A coupling 2 is connected to the end of the shaft 1 by means of a pin 3, this coupling being of a conventional type which can handle certain misalignment between the shaft 1 and the reversing mechanism illustrated in the drawing which is mounted on an output shaft 5 connected directly or indirectly to the feed mechanism of a field harvester, for instance, for operating the same. The coupling 2 is provided with external teeth for driving engagement with internal teeth of an extending hub portion 7 of a sun gear 8 of the reversing mechanism.

Figure 1:
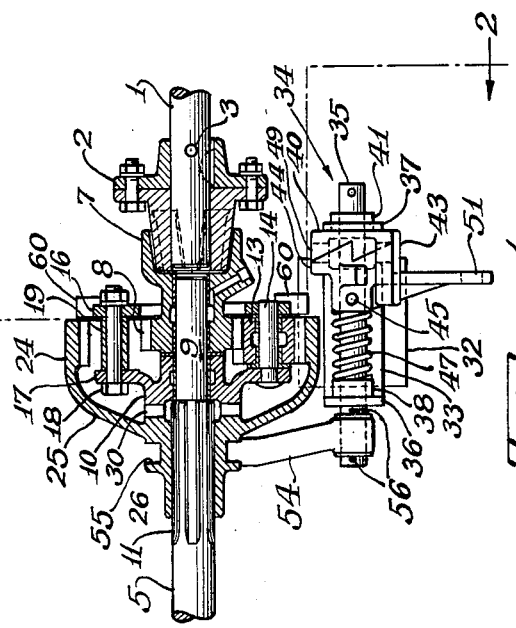

The sun gear 8 is journally supported on an extending portion 9 of the output shaft 5. A planet gear carrier 10 is also journally supported on the shaft extension 9, both the carrier 10 and sun gear 8 being prevented from moving axially on the shaft 5 towards the left as seen in FIGURE 1 by splines 11 on the shaft. A plurality of planet gears 13 are supported around the outer periphery of the carrier 10 by means of shaft members 14 suitably secured in the carrier by means of peening as shown. The ends of the planet support shafts 14 towards the coupling 2 are supported by a plate member portion 16 of the carrier 10 which is fixedly connected to and in parallel relation with the flange portion 17 of the carrier by means of bolts 18 and spacing sleeves 19.

A ring or orbit gear 24 is also provided between which and the sun gear 8 the planet gears 13 are in meshed engagement. The ring gear 24 is supported by a solid housing portion 25 and a central hub portion 26, the latter portion having internal axially extending splines around the inner periphery of a central bore therethrough for power transmission engagement with the splines 11 of the output shaft 5.

The housing portion 25 and the carrier 10 are each provided with projecting jaw clutch elements 28 and 29, respectively (see FIGURE 3) to provide an interlocked engagement between the housing portion and carrier when fully engaged, as shown in FIG. 1 at 30, to prevent relative rotation between the housing portion and carrier and thus provide a locked in relation between the ring gear 24 and planet gears 13 between the two at 30. Such locked engagement of the planetary gears 13 and ring gear 24 produces rotation of the output shaft 5 in the same direction of rotation as shaft 1.

32 is a support member which is fixed relative to the moving parts of the present reversing mechanism, this member being attached to any suitable supporting structure of a farm implement, for instance, such as a field harvester. A support member 33 is suitably and immovably secured to the first support member 32 for support of an actuator means generally designated 34 of the present invention.

The actuator means comprises an axially movable cam shaft 35 extending through flanges 36 and 37 of the support member 33 and being supported at one end by flange 36. Element 38 is a pad suitably jointed to the flange 36 as by welding to increase the bearing support of the cam shaft 35. A stationary cam member 40 having a central bore is positioned on the cam shaft 35, the member 40 having an extending portion 41 of square cross-section which is received within a conforming square opening in the flange 37 of the support member 33 to prevent rotation of the member 40. The central bore of the member 40 together with that of its extending portion 41 provides bearing support of an extending nature to the shaft 35 at the end thereof opposite the flange 36 and pad 38. The member 40 is also provided with an axially extending stop portion 43 for a purpose which will appear later.

A movable cam member 44 is mounted on the shaft 35 inwardly of the cam member 40, the member 44 being secured to and axially movable with the shaft 35 by means of a pin 45 extending therebetween. A compression coil spring 47 extends around the shaft 35 and between the pad 38 and movable cam member 44 so as to bias or urge the latter member to the right as seen in FIGURE 1 and into engagement with the member 40.

Figure 2:
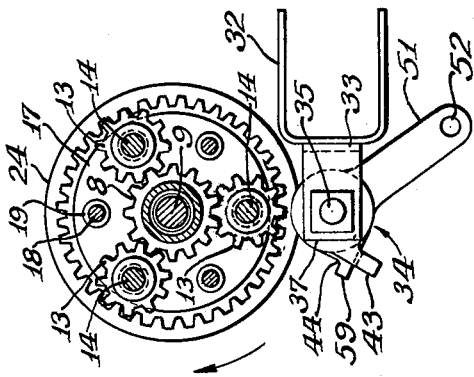
FIGURE 2 is a cross-sectional view taken on line 2—2 of FIGURE 1.

Each of the members 40 and 44 have a plurality of annularly arranged inter-engaging cam elements generally at 49 so formed and disposed as to cause axial movement of the cam member 44 to the left as seen in FIGURE 1 upon clockwise rotation of the member as seen in FIGURE 2 in opposition to the spring 47. The rotative movement of the cam member 44 is effected by movement of the lever 51 thereof from the position shown in FIG. 2 to that shown in FIG. 4 in which the lever is in abutting engagement with the stop 43 of the fixed cam member 40. The lever 51 may be suitably connected to the operator's station on a tractor which is hauling a field harvester, for instance, by means of a rope connected therethrough the hole 52 on the end of the lever. The axial movement of the cam shaft 35 imparted thereto from the member 44 by means of the pin 45 is transmitted to the hub portion 26 of the ring gear member by means of a shifter fork 54 which is received within an annular groove 55 in the hub portion 26. The shifter fork which is bifurcated for its engagement within the groove 55 is secured to the cam shaft 35 between cutter pins and washers 56.

The movable cam member 44 is provided with a projecting lug 59 which abuts against the stop 43 to limit movement of the lever 51 and the movable cam member in a counterclockwise direction under the action of the compression spring 47 when the pull on the rope connected through the hole 52 of the lever has been stopped. The plate member 16 of the carrier 10 is provided with a pair of oppositely disposed projecting lugs 60 one of which engages the lug 59 of the movable cam member 44 when the latter has been rotated in a clockwise direction by its handle 51 into the position shown in FIGURE 3 to prevent rotation of the carrier 10 and supported planet gears 13 beyond that necessary to bring one of the lugs 60 into abutting engagement with the lug 59. As can be seen especially from FIGURE 4, rotative movement of the handle 51 and the member 44 with its lug 59 in the clockwise direction is limited by engagement of the handle with the stop 43. The provision of a pair of projecting elements or lugs 60 on the plate member 16 of the carrier reduces the amount of rotation of the carrier, which rotation is in the clockwise direction as seen in FIGS. 2 and 4 assuming clockwise rotation of the shaft 1 and sun gear 8, for not more than 180° until engagement of one of the lugs 60 is had with the stop lug 59 of the cam member 44. Additional elements 60 or on the other hand only a single element 60 may be employed if desired to reduce the amount of rotation or on the other hand permitting a complete revolution of the carrier 10 before contact is had between the element 60 and stop 59.

In operation, the parts of the device are normally in the position shown in FIGURES 1 and 2 of the drawing. In this condition of the device the elements of the jaw clutch are engaging each other at 30 so as to lock the ring gear member and carrier 10 together to prevent any relative rotation between the two. Assuming clockwise rotation of the sun gear 8, as indicated by the arrow alongside the gear in FIG. 2, the locked ring gear member and carrier 10 together with the planet gears of the latter are rotated as a unit in a clockwise direction, as indicated by the arrow alongside the ring gear in FIG. 2 by the rotating sun gear, thus to transmit similar clockwise rotation to the shaft 5 by means of the inter-engaged splines of the hub portion 26 and of the shaft. It is pointed out that the stop lug 59 of the movable cam member 44 is at this time in a remote position from the lugs 60 of the plate member 16 of the carrier so as not to interfere with rotation of the carrier 10 and attached and engaged parts.

Figure 3:
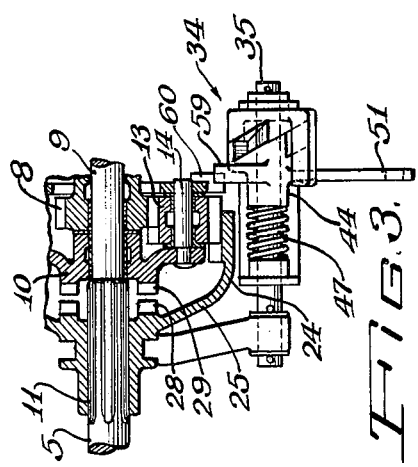
FIGURE 3 is a view similar to FIGURE 1 but showing a fragmentary portion of the reversing mechanism with the parts shown in position for reversed rotation of the output shaft.

When the actuating lever 51 of the reversing mechanism is moved into the position shown in FIGURES 3 and 4 the cam elements of the movable cam member 44 slide along the inclined faces of the cam elements of the stationary cam member 40 to move the member 44 to the left as seen in FIGURE 1 in opposition to the spring 47, carrying with the member the attached cam shaft 35. The axial movement of the shaft 35 to the left as seen in FIGURE 1 is transmitted by the shifter fork 54 engaged within the groove 55 of the ring gear member to shift the latter to the left along the splines 11 of the shaft 5 and completely out of engagement with the clutch elements of the carrier member 10. The stop lug 59 of the movable cam member 44 is simultaneously with the disengagement of the clutch at 30 and the unlocking of the carrier 10 with its planet gears 13 and the ring gear 24 from each other moved into position for engagement by one of the projecting lugs 60 of the carrier plate 16. The engagement between the two lugs stops rotation of the carrier 10 with its supported planet gears 13 which, together with the unlocked condition of the carrier 10 relative to the ring gear member provides for rotation of the ring gear 24 in the opposite direction to that previously mentioned in connection with FIGURES 1 and 2, which motion is transmitted to the shaft 5 for reversal of the feed mechanism of a field harvester, for instance, with which the present device is particularly adapted to be used in the form shown in the drawing.

When the feed conveying mechanism of the field harvester, for instance, has been operated in the reverse direction a sufficient length of time to unplug the restricted mouth of the implement and discharge the plugging crop from the feeding portion of the implement the rope, for instance, connected through the hole 52 at the end of the lever 51 and which rope has been held in a taut condition by the operator of the implement, is let go of whereupon the compression spring 47 acting against the movable cam member 44 is effective to automatically rotate the cam member and handle in the reverse direction and axially move the same into the extreme right hand position shown in FIGURES 1 and 2 to complete the cycle of operation. During such reverse movement of the movable cam member 44, the attached shaft 35 and shifter fork 54 is also moved to the right into the positions shown in FIGURE 1, thus to return the ring gear member into the right hand position shown in the figure wherein the clutch elements thereof are once again in inter-engaged relation with the clutch elements of the carrier 10 to once again provide the locked-in relation between the two members and prevent relative rotation therebetween.

It is therefore seen that the reversing mechanism actuating means of the present invention simultaneously moves the ring gear unit out of the interlocked engaged relation with the planet gear carrier 10 and places the stop lug 59 of the moving cam member 44 in the path of the projecting lugs 60 of the plate member 16 to thus stop and prevent rotation of the carrier 10 and the supported planet gears 13 to thus effect reversal of the direction of rotation of the ring gear and its connected parts and of the output shaft 5 driven thereby. Reverse movement of the actuating means reestablishes the locked engagement between the ring gear and connected parts and the carrier 10 with its planet gears and simultaneously therewith removes the stop plug 60 so that it cannot interfere with rotation of the locked carrier, planet gears, and ring gear to produce rotation of the output shaft 5 in the original direction.

It is evident from the above description that a very effective and relatively inexpensive reversing mechanism has been provided for use in agricultural implements such as field harvesters and in other devices.

It is pointed out that the power shaft 1 may be rotated in the opposite direction to that above indicated and further that shaft 5 may be the input shaft and shaft 1 the output shaft, if desired, the input shaft 5 in the latter case also being rotatable in either direction of rotation with the reversing mechanism equally operative and effective in all instances.

Although the present reversing mechanism has been described in connection with the feed drive of a field harvester, the same may be employed generally wherever it is desired to provide for reversal of the rotation of a shaft or other means.

Although a specific embodiment has been disclosed, it should be understood that modifications and other forms of the invention are contemplated and therefore the appended claims should be limited only by their terms construed within the broad spirit of the overall invention in its various aspects.

What is claimed is:

1. In a reversing mechanism, the combination comprising a rotatable sun gear, an internally toothed rotatable ring gear and means integral and rotatable with the ring gear, a plurality of individually rotatable planet gears intermediate and in meshed engagement with the sun and ring gears, means carrying the planet gears rotatable about the axis of the sun and ring gears, the carrying means and means rotatable with the ring gear having means so formed and engageable with each other as to cause one of said carrying means and means rotatable with the ring gear to carry the other of said carrying means and means rotatable with the ring gear with it in unitary rotational movement during rotation of said one of said carrying means and means rotatable with the ring gear in one direction and thus prevent relative rotation between said carrying means and means rotatable with the ring gear during rotation of said one of said carrying means and means rotatable with the ring gear, in said one direction, actuator means for moving at least one of said carrying means and means rotatable with the ring gear axially away from the other of said carrying means and means rotatable with the ring gear so as to disengage the means of said carrying means and of the means rotatable with the ring gear engageable with each when in engagement with each other whereby to permit relative rotation between said carrying means and means rotatable with the ring gear, the length of the ring gear and lengths of the planet gears being such as to provide sufficient meshed engagement between the ring gear and planet gears for effective transmission of power between the two after disengagement of the means of said carrying means and of the means rotatable with the ring gear engageable with each other, and means engageable between the actuator means and said carrying means at least shortly after said disengagement to prevent rotation of said carrying means in the direction it tends to move after said disengagement whereby with said disengagement to reverse the directions of rotation of the sun gear and ring gear relative to each other as compared to the rotation of each prior to said disengagement.

2. The subject matter of claim 1 in which the actuator means is resiliently biased to preserve said engagement between the means of said carrying means and of the means rotatable with the ring gear engageable with each other except when the actuator means has been operated to cause said disengagement.

3. The subject matter of claim 1 in which the actuator means is resiliently biased to preserve said engagement between the means of said carrying means and of the means rotatable with the ring gear engageable with each other, except when the actuator means has been operated to cause said disengagement, and to reestablish said engagement when not existing and force on the actuator means retaining the means of said carrying means and of the means rotatable with the ring gear engageable with each other out of engagement with each other is eliminated.

4. The subject matter of claim 1 in which the actuator means comprises a pair of members each having means engageable with the means of the other member to produce rectilinear movement of one of said members relative to the other member upon rotation of one of said members relative to the other of said members, means for receiving the rectilinear movement of said member so movable effective to move one of said carrying means and means rotatable with the ring gear away from the other of said carrying means and means rotatable with the ring gear so as to disengage the means of said carrying means and of the means rotatable with the ring gear engageable with each other when in engagement with each other, the means engageable between the actuator means and said carrying means comprising means on said member of the actuator means which is rotated to produce the rectilinear movement of one of the members relative to the other member engageable with said carrying means at least shortly after rotation of said member which is rotated to produce the rectilinear movement of one of the members relative to the other member for the disengagement of the means of said carrying means and of the means rotatable with the ring gear engageable with each other to prevent rotation of the carrying means in the direction it tends to move after said disengagement.

5. The subject matter of claim 4 in which said member which is rectilinearly movable is rectilinearly movable in the opposite direction to that producing said disengagement upon rotation of the member which is rotated to produce said disengagement in the opposite direction of rotation to that producing said disengagement back to its original position prior to initiation of the disengaging action, said means for receiving the first-named rectilinear movement for producing said disengagement and effective to move one of said carrying means and means rotatable with the ring gear away from the other of said carrying means and means rotatable with the ring gear for said disengagement also being effective to produce engagement between the means of said carrying means and of the means rotatable with the ring gear engageable with each other for the return to the original non-disengaged relation of these means upon rectilinear movement of said rectilinearly movable member in the opposite direction to that producing said disengagement and substantially back to its original position prior to the initiation of said disengaging action.

6. The subject matter of claim 4 in which the carrying means includes a portion on one side of the planet gears having an abutment surface engageable with the means on said member of the actuator means which is rotated to produce the rectilinear movement of one of the members relative to the other member at least shortly after rotation of said member which is so rotated at least to an extent sufficient to produce said disengagement.

7. A subject matter of claim 6 in which the abutment surface of the carrying means is to one side of the planet gears and the means of the carrying means engageable with said means of said means rotatable with the ring gear being to the other side of the planet gears.

8. The subject matter of claim 1 in which the actuator means comprises a pair of members each having surface means so formed and disposed as to engage the surface means of the other member and produce movement of one of said members away from the other member upon rotation of one of said members relative to the other of said members, means for receiving the moving away movement of said member which is movable away from the other member effective to move one of said carrying means and means rotatable with the ring gear away from the other of said carrying means and means rotatable with the ring gear so as to disengage the means of said carrying means and of the means rotatable with the ring gear engageable with each other when in engagement with each other, the means engageable between the actuator means and said carrying means comprising means on said member of the actuator means which is rotated to produce the movement of one of the members away from the other member engageable with said carrying means at least shortly after rotation of said member which is rotated to produce the movement of one of the members away from the other member for the disengagement of the means of said carrying means and of the means rotatable with the ring gear engageable with each other to prevent rotation of the carrying means in the direction it tends to move after said disengagement.

9. In a reversing mechanism, the combination comprising a rotatable sun gear, an internally toothed rotatable ring gear and means integral and rotatable with the ring gear, a plurality of individually rotatable planet gears intermediate and in meshed engagement with the sun and ring gears, means carrying the planet gears rotatable about the axis of the sun and ring gears, said carrying means and means rotatable with the ring gear having means so formed and engageable with each other as to prevent substantial relative rotation between said carrying means and means rotatable with the ring gear for an interlocked relation between the two, actuator means for moving at least one of said carrying means and means rotatable with the ring gear axially away from the other of said carrying means and means rotatable with the ring gear so as to disengage the means of said carrying means and of the means rotatable with the ring gear engageable with each other when in engagement with each other whereby to permit relative rotation between said carrying means and means rotatable with the ring gear, the length of the ring gear and lengths of the planet gears being such as to provide sufficient meshed engagement between the ring gear and planet gears for effective transmission of power between the two after disengagement of the means of said carrying means and of the means rotatable with the ring gear engageable with each other, and means engageable between the actuator means and said carrying means at least shortly after said disengagement to prevent rotation of said carrying means in the direction it tends to move after said disengagement whereby with said disengagement to reverse the directions of rotation of the sun gear and ring gear relative to each other as compared to the rotation of each prior to said disengagement.

10. The subject matter of claim 9 including a support means, the means rotatable with the ring gear, said carrying means and the sun gear being mounted on the support means at least said rotatably carrying means and sun gear being relatively supported on the support means.

11. The subject matter of claim 9 in which the actuator means comprises a pair of members each having means engageable with the means of the other member to produce rectilinear movement of one of said members relative to the other member upon rotation of one of said members relative to the other of said members, means for receiving the rectilinear movement of said member so movable effective to move one of said carrying means and means rotatable with the ring gear away from the other of said carrying means and means rotatable with the ring gear so as to disengage the means of said carrying means and of the means rotatable with the ring gear engageable with each other when in engagement with each other, the means engageable between the actuator means and said carrying means comprising means on said member of the actuator means which is rotated to produce the rectilinear movement of one of the members relative to the other member engageable with said carrying means at least shortly after rotation of said member which is rotated to produce the rectilinear movement of one of the members relative to the other member for the disengagement of the means of said carrying means and of the means rotatable with the ring gear engageable with each other to prevent rotation of the carrying means in the direction it tends to move after said disengagement.

12. The subject matter of claim 11 in which the carrying means includes a portion on one side of the planet gears having an abutment surface engageable with the means on said member of the actuator means which is rotated to produce the rectilinear movement of one of the members relative to the other member at least shortly after rotation of said member which is so rotated at least to an extent sufficient to produce said disengagement.

References Cited in the file of this patent
UNITED STATES PATENTS
469,468     Gilbert _____ Feb. 23, 1892
FOREIGN PATENTS
19,144     Great Britain _____ 1906